(No Model.)  6 Sheets—Sheet 1.
J. H. DALE & H. DENNEY.
MACHINE FOR MAKING ENVELOPS.
No. 558,046.   Patented Apr. 14, 1896.
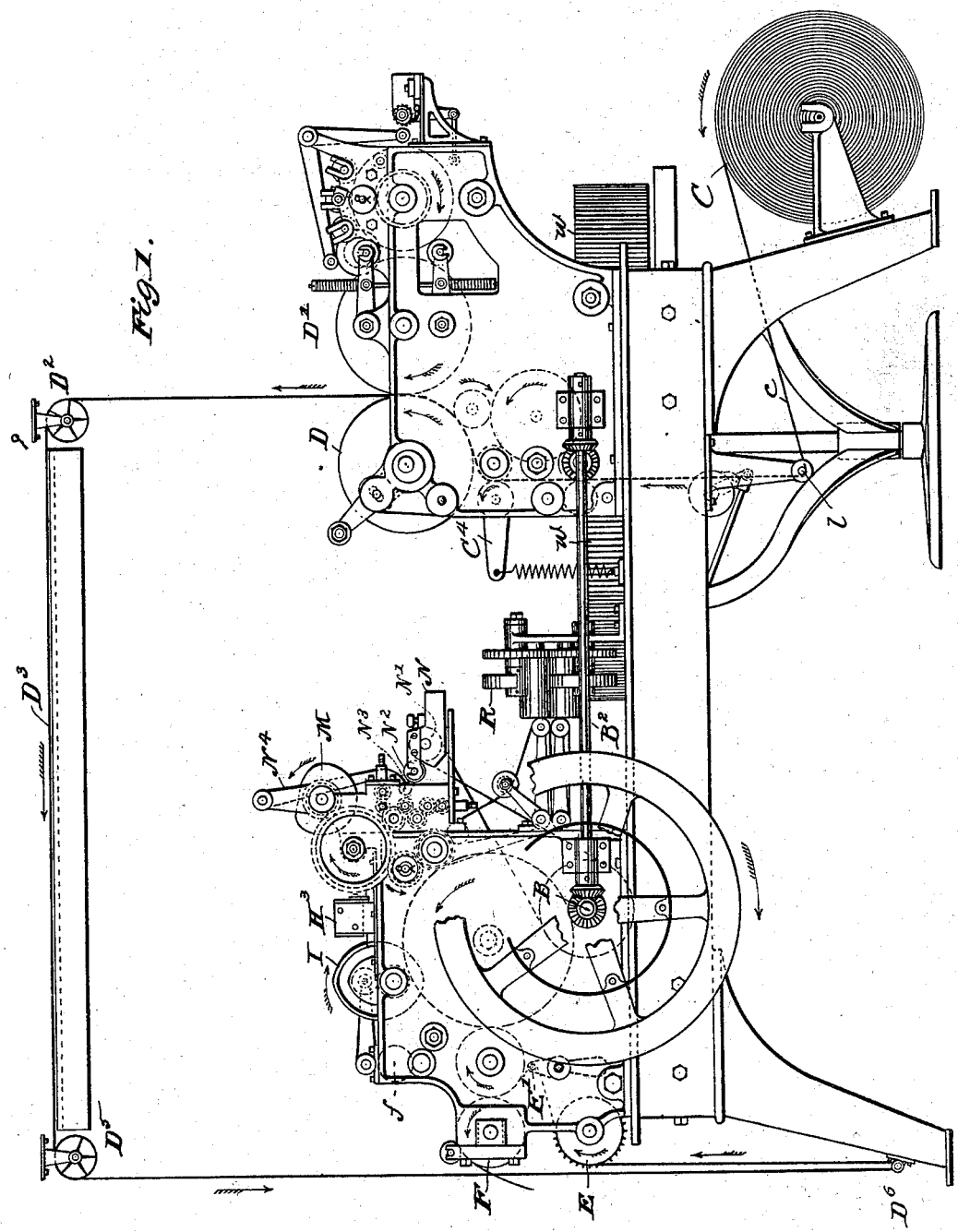

(No Model.) 6 Sheets—Sheet 2.
J. H. DALE & H. DENNEY.
MACHINE FOR MAKING ENVELOPS.
No. 558,046. Patented Apr. 14, 1896.
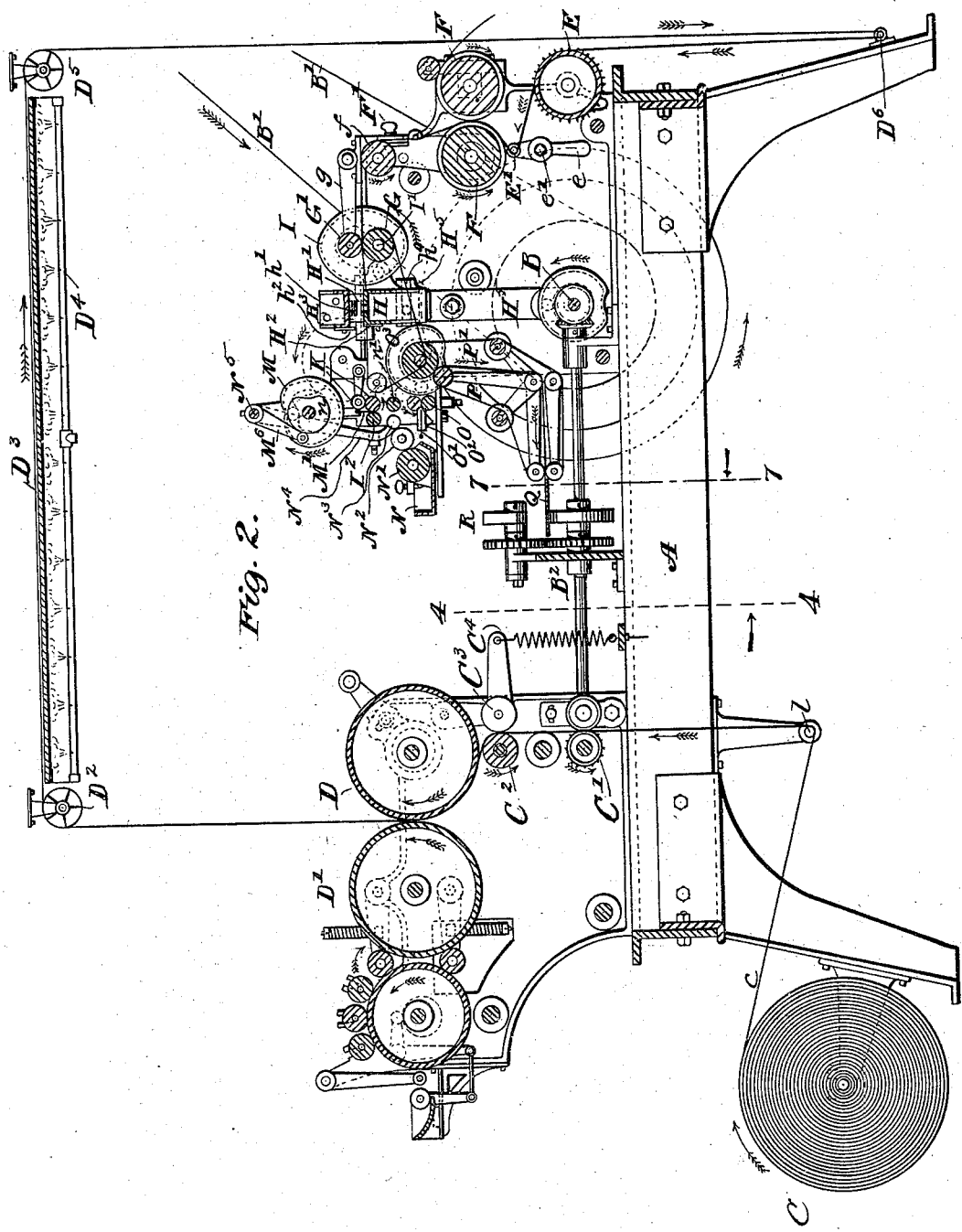

(No Model.)  6 Sheets—Sheet 3.
J. H. DALE & H. DENNEY.
MACHINE FOR MAKING ENVELOPS.
No. 558,046. Patented Apr. 14, 1896.
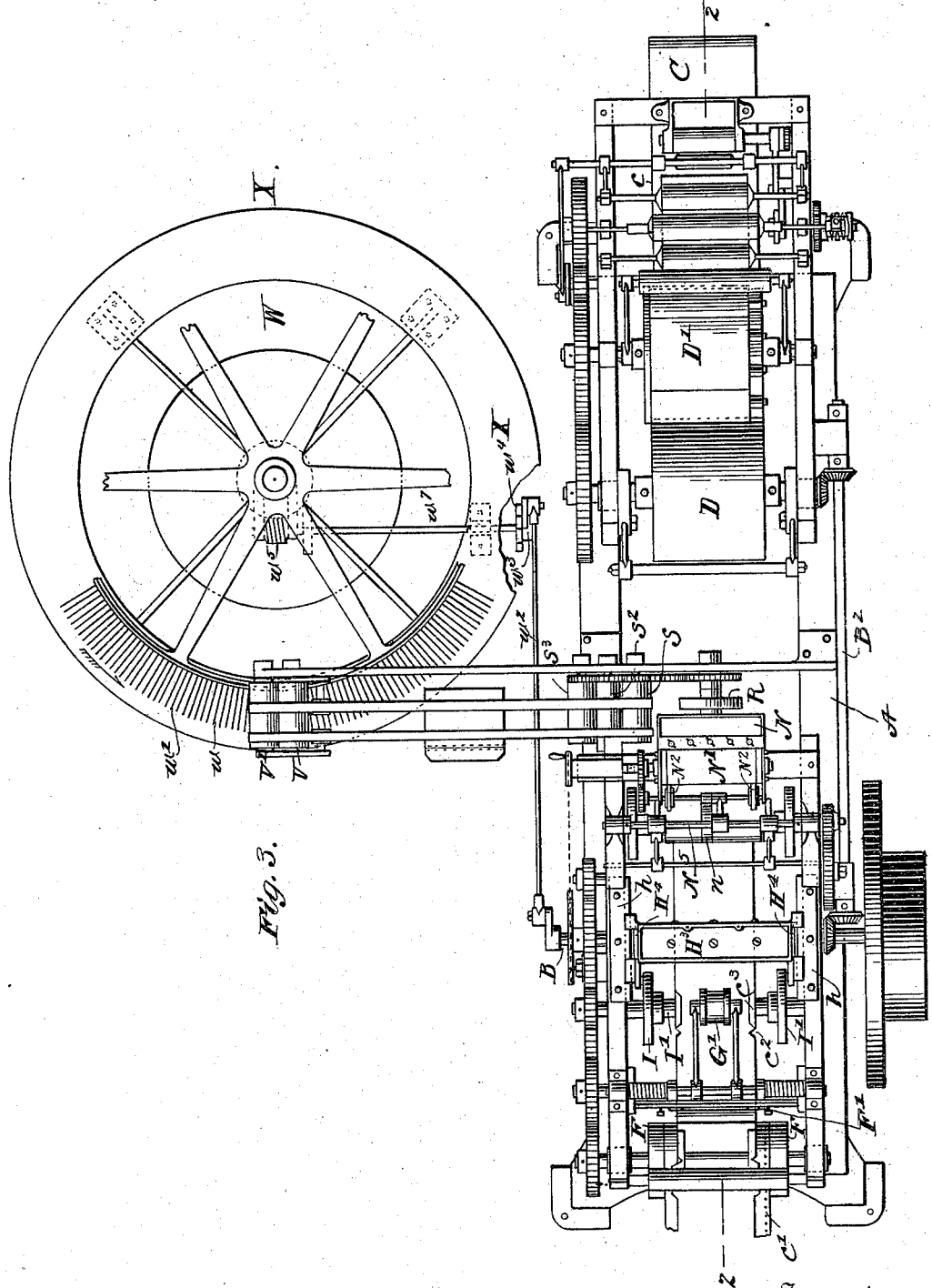

(No Model.) 6 Sheets—Sheet 4.
J. H. DALE & H. DENNEY.
MACHINE FOR MAKING ENVELOPS.
No. 558,046. Patented Apr. 14, 1896.
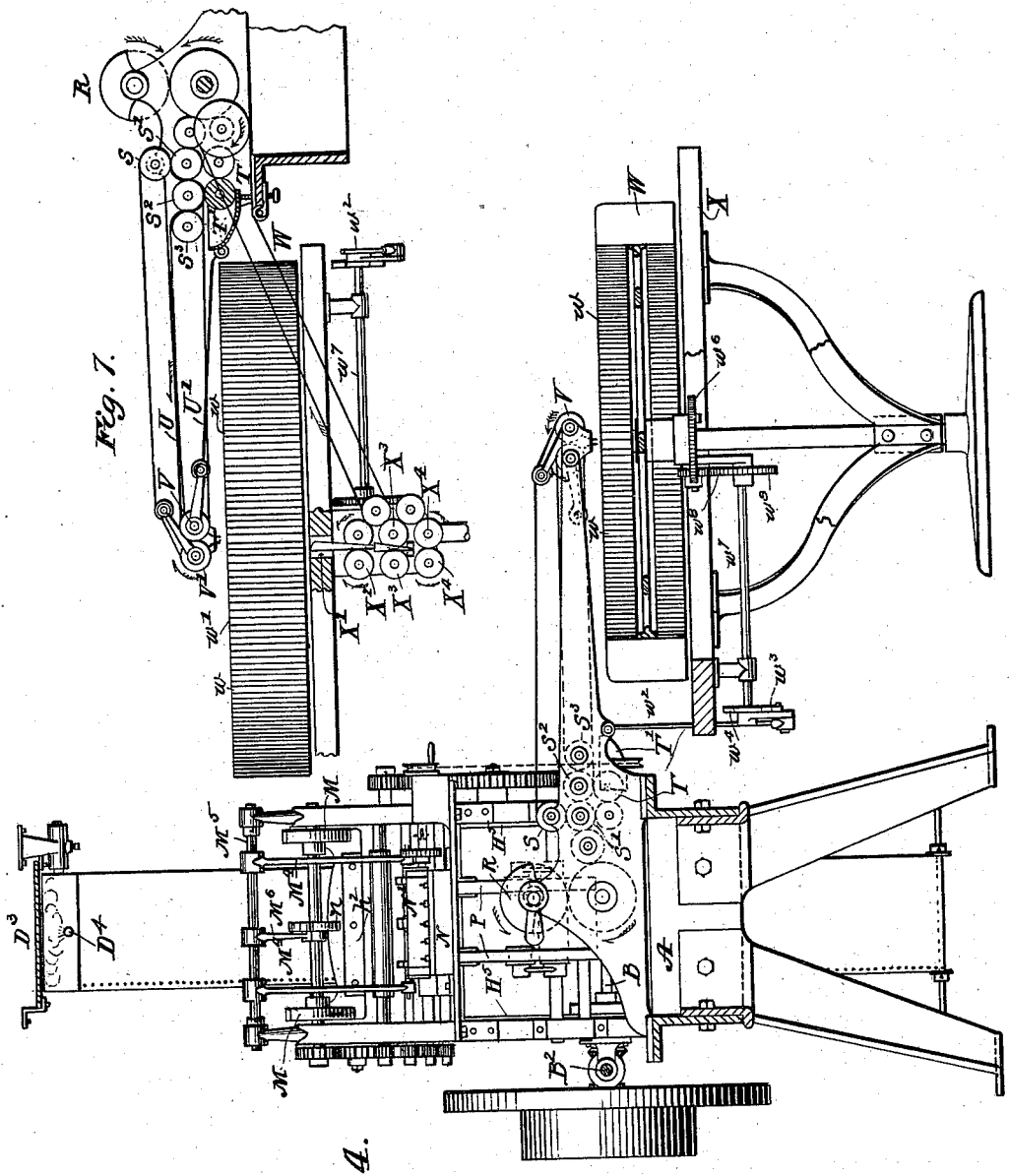

(No Model.) 6 Sheets—Sheet 5.
J. H. DALE & H. DENNEY.
MACHINE FOR MAKING ENVELOPS.
No. 558,046. Patented Apr. 14, 1896.
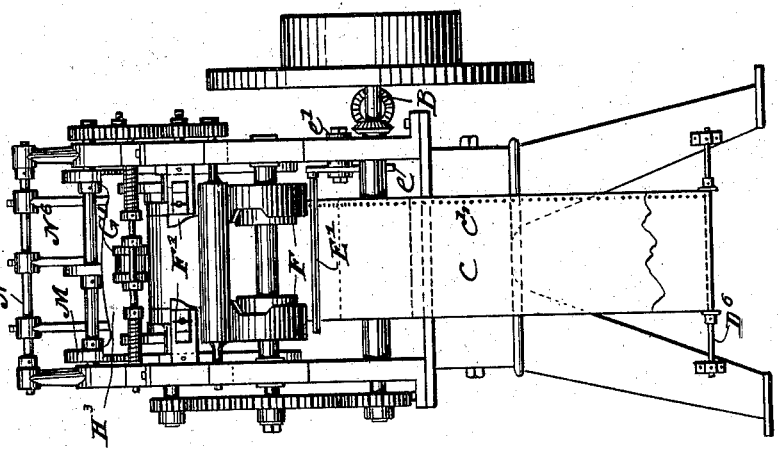
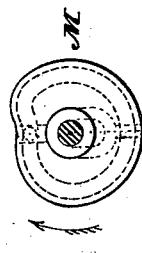
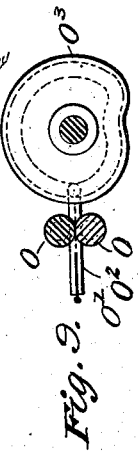
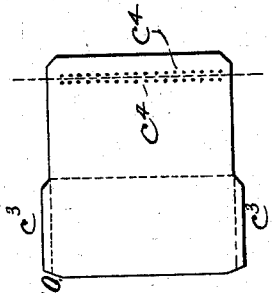
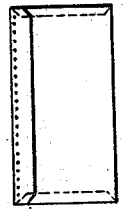
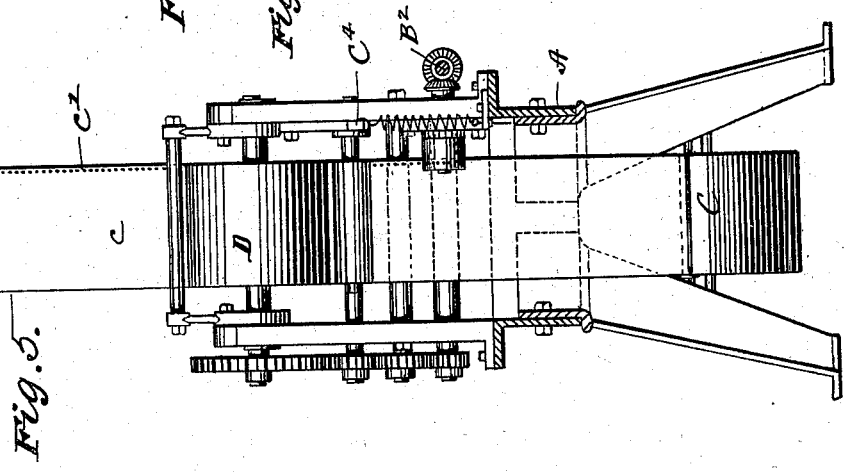
Witnesses
Frank L. Obrr.
C. V. Edwards.
Inventors
John H. Dale
and
Harmer Denney
By their Attorneys
Baldwin Davidson & Wight.

(No Model.) 6 Sheets—Sheet 6.
J. H. DALE & H. DENNEY.
MACHINE FOR MAKING ENVELOPS.
No. 558,046. Patented Apr. 14, 1896.
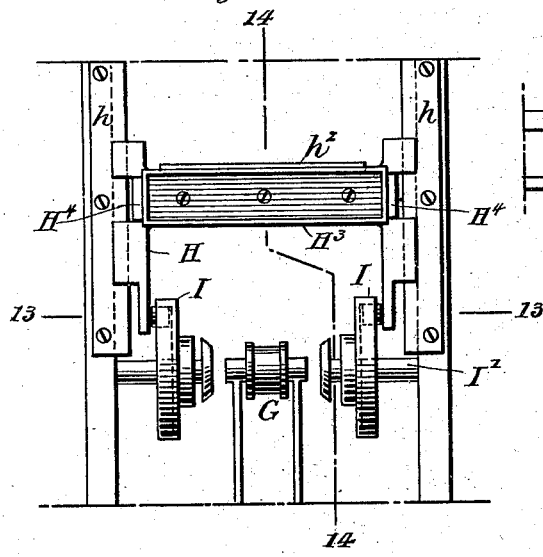
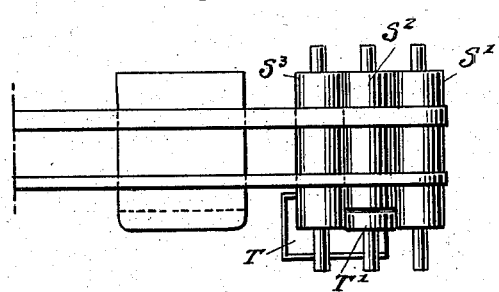
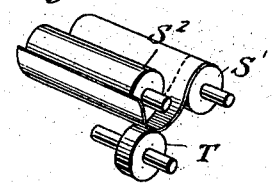
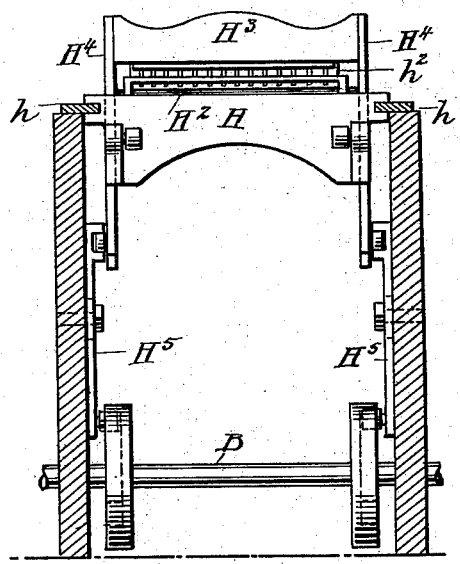
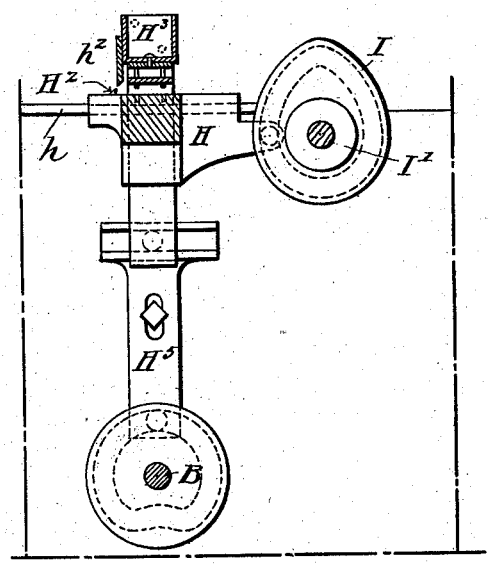

UNITED STATES PATENT OFFICE.

JOHN H. DALE AND HARMER DENNEY, OF NEW YORK, N. Y., ASSIGNORS TO PETER B. SWEENY, OF SAME PLACE.

MACHINE FOR MAKING ENVELOPS.

SPECIFICATION forming part of Letters Patent No. 558,046, dated April 14, 1896.

Application filed June 18, 1894. Serial No. 514,950. (No model.)

*To all whom it may concern:*

Be it known that we, JOHN H. DALE and HARMER DENNEY, citizens of the United States, residing at New York, in the county and State of New York, have invented certain new and useful Improvements in Machines for Making Envelops, of which the following is a specification.

The object of this invention is to produce, economically and rapidly, envelops of a special style herein described and illustrated; and the invention comprises certain improved organizations claimed, whereby a continuous strip of paper from a roll is printed, its edges cut to the desired contour to form the subsequently severed envelop-blanks, and the blanks folded and gummed to complete the envelops.

In the accompanying drawings, which illustrate our invention in the form best known to us, Figure 1 is a side elevation; Fig. 2, a vertical central longitudinal section on the line 2 2 of Fig. 3; Fig. 3, a plan view; Fig. 4, a cross-section on the line 4 4 of Fig. 2, looking in the direction of the arrow; Fig. 5, a cross-section on the same line, looking in the opposite direction; Fig. 6, an elevation of the folding end of the machine; Fig. 7, a view, partly in elevation and section on the line 7 7 of Fig. 2, looking in the direction of the arrow; Fig. 8, an enlarged detail view of the device for forming the first transverse fold— *i. e.*, the fold of the closing-flap—which is subsequently folded out again when the second transverse fold of the body is made and one side of the body is pressed upon the gummed faces of the folded side flaps; Fig. 9, a similar view of the devices for forming the second transverse or body fold; Fig. 10, a view of the blank with all folds opened, the lines of the folds being indicated by dotted lines. Fig. 11 shows the completed envelop. Fig. 12 is a detail plan view, and Fig. 13 a transverse sectional view, showing the blank perforating and severing devices and some parts contiguous thereto; Fig. 14, a longitudinal section on the line 14 14 of Fig. 12; Fig. 15, a detail plan view illustrating the carrying-tapes and the rolls through which the envelop is passed while the closing-flap is being gummed, and Fig. 16 is a detail perspective view of the gumming-wheel and two of the rolls through which the envelop is passing while the closing-flap is being gummed.

The frame of the machine is marked A, and mounted therein is a driving-shaft B, equipped with a pulley driven by a belt B'. From this shaft the mechanisms for operating upon the paper strip to finally complete the envelop are driven by suitable gearing, the direction of rotation being indicated by arrows, and by means of a counter-shaft $B^2$ and miter-gear connections the printing devices and the device for forming a longitudinal row of perforations in the edge of the continuous paper strip are actuated in proper time from the shaft B. The roll of paper C is mounted on a spindle supported in brackets at one end of the machine, and the paper strip (which is marked *c*) passes thence over a guide-pin or small roll *l* vertically between the perforating-rolls C', by which the row of perforations *c'* is formed in the edge of the continuous strip. These perforations are designed to coöperate with a sprocket or pin wheel to properly guide and time the paper strip at a subsequent operation, as hereinafter described.

The paper strip thence passes between driven feeding or drawing rolls $C^2$, one of which has its bearings at the angles of two bell-crank levers $C^3$, and the projecting arm of one of said levers is connected by a spiral spring $C^4$ with the frame, so that a proper pressure or grip upon the paper strip may be maintained. From these feed-rolls the strip passes between the impression-cylinder D and type-cylinder D' of a printing mechanism of usual construction, the desired printed impression being made upon that part of the strip that subsequently forms the back and front of the completed envelop. Thence the strip passes vertically over a roll $D^2$ and then horizontally over a drying-plate $D^3$, heated beneath by gas-jets $D^4$, or in any other suitable manner, the length of the drying-plate and its temperature being such as to properly dry the ink. The drier may be dispensed with, even when the machine is run at top speed, where quick-drying inks are used. The strip then passes over a roll $D^5$ and down around a roll or pin $D^6$, and thence upwardly to a pin or sprocket wheel E, whose projections or pins coincide with and enter the perforations $c'$ in the edge of the strip and insure the feed of the strip to the blank-cutters in proper relation to the printed matter impressed upon the strip. The strip then passes around an adjustable guide pin or roller E', adjusted by a handle $e$ and secured by a set-nut $e'$, (this adjustment being provided to also insure the proper relation of the printed matter and blank-cutting devices,) thence between pairs of cutting-rolls F F, so shaped and acting as to cut the proper marginal contour of the two edges of the strip, as seen in Figs. 3 and 10, the perforated edge of the paper being cut away and the side notches $c^2$ and side flaps $c^3$ being formed at each edge. The strip then passes up between edge-folders F' F', (analogous to ordinary hemming-folders and of usual construction,) by which the side flaps $c^3$ are folded over on the strip, as seen in Fig. 3. From these side folders the strip passes over a roll $f$, and thence horizontally between feed-rolls, the bottom one G of which is driven, and the upper one G' is supported by spring-arms $g$, at this point the side flaps being already folded over, as stated. The strip then passes between blank perforating and severing devices, which may be constructed as follows: A frame H slides horizontally in ways $h$ on the main frame and carries below the strip two parallel transverse rows of female perforating-dies H' and a shearing or cutting edge $H^2$, and above the strip corresponding transverse parallel rows of perforating punches $h'$ and a cutter $h^2$. The cross-piece $H^3$, carrying these upper parts, is supported at each end by uprights $H^4$, that slide vertically in the horizontally-reciprocating frame H, and have each a projecting pin or small roller that travels in a horizontal groove $h^4$ in the upper end of a bar $H^5$, sliding vertically in ways in the main frame, and the bars $H^4$ $H^5$ and cross-piece $H^3$ are all moved downward by cams on shaft B, into which pins on $H^5$ work (see Fig. 2) to draw down the cutter and perforator at the proper time to sever a blank and cut in the succeeding blank the two rows of perforations $c^4 c^4$, Fig. 10, one row on each side of the line on which the closing-flap of the envelop is to be folded. These cutting devices are reciprocated horizontally by cams I I on a shaft I', and the forward movement is at the same speed as that at which the paper strip is traveling. The blank thus severed is seen in Fig. 10, except that the side flaps $c^3$ have been folded over. The severed blank now passes forward between rollers K, and the closing-flap passes over the folding-rolls $I^2$. At the proper time the cam M moves the folding-blade M' downward, and the flap is folded between the parallel lines of perforations, the folded edge passing down between the rollers $I^2$ and K.

N is the paste-box, N' the roller running therein, $N^2$ the paste-distributing rolls, and $N^3$ the dabbing or paste-applying rolls, which are mounted on arms $N^4$, projecting from a rock-shaft $N^5$, that carries an arm $M^6$, acted upon by a cam $n$ to at the proper time throw the paste-dabbing rolls $N^3$ against the exposed faces of the folded side flaps, the blank being held up against the dabbing-rolls by a roller $n'$. The blank now passes down until the line for the transverse body-fold comes opposite the bite of two folding-rolls O. When a folding-blade O', supported at each end by a rod $O^2$, actuated by a cam $O^3$, is drawn forward, the body of the blank is folded transversely and the folded edge pressed between the rolls O. The width of this blade is less than the distance between the edge of the inwardly-folded closing-flap and transverse body-fold made by the blade, and consequently, as the cam causes the blade to recede, the blade catches the edge of the folding-flap and draws or folds the flap out. The side of the body has in this folding operation been pressed against the pasted flaps and that portion of the envelop completed.

The closing-flap is yet to be gummed or pasted, dried, and folded down. From the folding-rolls O the partially-completed envelop now passes between tapes P P', which carry it downward and turning it at right angles delivers it upon a horizontal table Q, from whence it is drawn laterally endwise by a D-roll R and delivered to feed-rolls S S'. Thence it passes down between S' and roll $S^2$, under $S^2$, and then up between $S^2$ and roll $S^3$. While passing in this sinuous course through these rolls the lip of the closing-flap, which projects beyond the end of the roll $S^2$, that is somewhat shorter than the rolls S' $S^3$, is gummed by a roll T, running in a paste or gum box T', the flap being held up against the pasting-roll by the roll $S^2$. The curvature given to the flap of the envelop serves to stiffen it, so that it will properly take the gum or paste from the roll T. This construction is designed to prevent the application of gum to the roll $S^2$, which will be liable to occur if such roll projected to the edge of the envelop flap—that is to say, we are enabled to apply the paste to the extreme edge of the flap and avoid the fouling of the carrying-rolls, and consequently the marring of the closing-flaps. From the roll $S^3$ the envelop passes between carrying-tapes U U' and is delivered to the bite of rolls V V', between which it passes downwardly, being directed by guides $v$, and is delivered into one of a series of pockets $w$, formed by radial partitions $w'$ on a circular revolving frame W. This table is driven step by step from the driving-shaft B by a crank-and-pitman connection $w^2$, actuating a pawl $w^3$, driving a ratchet-wheel $w^4$ on a shaft $w^7$, having a gear $w^9$, driving a gear $w^8$ on the worm $w^5$, that drives the wheel $w^6$ on the revolving frame W. The pockets $w$ are closed at the bottom by an annular stationary plate or ring X, which has an opening X' in it, through which the envelops are successively dropped after having been carried through approximately one revolution of the revolving frame, during which the gum on the lip of the closing-flap has had opportunity to dry. When the envelop falls through the opening X', it is caught between rolls $X^2 X^2$, and thence passes between pairs of rolls $X^3 X^3$ and $X^4 X^4$, and during its passage between such rolls the closing-flap is folded down by a folding-guide Y, and the now-completed envelop is delivered into any suitable receptacle. The revolving circular frame is of course moved one step each time an envelop-blank is severed from the continuous paper strip.

The various shafts, gears, and belts and their directions of movement or rotation have been indicated, and it seems unnecessary to load the specification with minute description of their specific connections, since the operations described may be accomplished by the mechanism shown or any other equivalent well-known devices.

In the completed envelop the two lines of perforations come opposite each other and are intended to afford a ready means of opening the sealed envelop by tearing the edge along the line of the perforations.

We claim as our invention—

1. In an envelop-machine for continuously forming envelops from a continuous strip of paper, the combination, substantially as set forth, of paper-roll-carrying devices, means for forming a line of perforations in the edge of a continuous strip, devices for printing upon the continuous strip, cutting devices for forming the contour of the edges of the continuous strip, a sprocket or pin wheel coöperating with the line of perforations in the strip to deliver the strip in accurate time to the cutting devices, means for folding the side flaps of the envelops formed at the edges of the strip, means for severing the blanks from the continuous strip, and means for successively applying paste to the exposed faces of the folded side flaps, folding the body of the envelop down thereupon, gumming the closing-flaps, drying the same, and finally folding the closing-flaps.

2. In an envelop-machine for continuously forming envelops from a continuous strip of paper, the combination, substantially as set forth, of paper-roll-carrying devices, means for forming a line of perforations in the edge of a continuous strip, devices for printing upon the continuous strip, a heater over which the printed strip passes to dry the ink, cutting devices for forming the contour of the edges of the continuous strip, a sprocket or pin wheel coöperating with the line of perforations in the strip to deliver the strip in accurate time to the cutting devices, means for folding the side flaps of the envelops formed at the edges of the strip, means for severing the blank from the continuous strip, and means for successively applying paste to the exposed faces of the folded side flaps, folding the body of the envelop down thereupon, gumming the closing-flaps, drying the same, and finally folding the closing-flaps.

3. In an envelop-machine, the combination, substantially as set forth, with mechanism for forming envelops from a continuous strip of paper, with the exception of the gumming and folding of the closing-flaps, mechanism for then gumming the lips of the closing-flaps, a horizontal revolving frame having a series of vertical compartments open at the bottom into which the envelops after the gumming of the closing-flaps are successively delivered, and a plate X beneath the revolving frame having a discharge-opening through which the envelops are successively discharged after being carried through an approximate revolution of the frame, and devices for then folding the closing-flaps.

4. In an envelop-machine, the combination, substantially as set forth, with mechanism for making envelops from a continuous strip of paper complete with the exception of the gumming and folding of the closing-flaps, a series of rolls to which the thus partly-completed envelops are delivered, such rolls being arranged in different planes so that the envelops pursue a sinuous course between them, and means for applying the gum to the lips of the projecting curving closing-flaps while thus curved in their sinuous course through said rolls, means for drying the gummed flaps, and mechanism for folding the flaps to complete the envelop.

In testimony whereof we have hereunto subscribed our names.

JOHN H. DALE.
    HARMER DENNEY.

Witnesses:
 FRANK S. OBER,
 CATHARINE GEORGI.